United States Patent
Georgi et al.

(10) Patent No.: US 11,947,367 B2
(45) Date of Patent: Apr. 2, 2024

(54) PRESSURE CONTROL CHARACTERISTIC—DIFFUSER

(71) Applicant: ebm-papst Landshut GmbH, Landshut (DE)

(72) Inventors: Plamen Georgi, Altdorf (DE); Sebastian Stolz, Ergolding (DE)

(73) Assignee: EBM PAPST LANDSHUT GmbH, Landshut (DE)

( * ) Notice: Subject to any disclaimer, the term of this patent is extended or adjusted under 35 U.S.C. 154(b) by 0 days.

(21) Appl. No.: 17/699,370

(22) Filed: Mar. 21, 2022

(65) Prior Publication Data
US 2022/0308603 A1 Sep. 29, 2022

(30) Foreign Application Priority Data
Mar. 23, 2021 (DE) ...................... 10 2021 107 202.6

(51) Int. Cl.
*G05D 16/06* (2006.01)
*F16K 1/42* (2006.01)

(52) U.S. Cl.
CPC .......... *G05D 16/0666* (2013.01); *F16K 1/42* (2013.01)

(58) Field of Classification Search
CPC .. G05D 16/0666; G05D 16/202; G05D 7/005; F16K 1/42
See application file for complete search history.

(56) References Cited

U.S. PATENT DOCUMENTS

| | | | | |
|---|---|---|---|---|
| 2,709,065 A * | 5/1955 | Pohndorf | ........... | G05D 16/0663 137/505.42 |
| 5,186,209 A * | 2/1993 | McManigal | ....... | G05D 16/0672 137/505.11 |
| 6,321,772 B1 * | 11/2001 | Uehara | ................ | B65G 47/917 137/907 |
| 7,192,665 B2 * | 3/2007 | Nakajima | ......... | H01M 8/04089 137/87.06 |

(Continued)

FOREIGN PATENT DOCUMENTS

| | | |
|---|---|---|
| DE | 609764 C | 2/1935 |
| DE | 1088306 A | 9/1960 |

(Continued)

OTHER PUBLICATIONS

Search Report for German Patent Application No. 10 2021 107 202.6 dated Feb. 9, 2022, 8 pages.

(Continued)

*Primary Examiner* — Patrick C Williams
(74) *Attorney, Agent, or Firm* — Christopher J. Volkmann; Kelly, Holt & Christenson, PLLC.

(57) ABSTRACT

Gas flow control valve 3, wherein the gas flow control valve 3 comprises a housing 11 with a gas inlet 10, a valve seat 6 arranged in the housing 11, a valve body 5 assigned to the valve seat 6, wherein the valve body 5 is held by an upper spring and a lower spring and is centered by means of a diaphragm 26, and a gas outlet 12 which is positioned downstream of the valve body 5 and which is provided in the housing 11, wherein the valve body 5 is arranged in the valve seat 6 so as to be movable in a first movement direction 17 in order to form a controllable cross section of a passage opening 25 for the passage of gas, wherein the gas flow control valve 3 comprises an adjustable diffuser 13.

19 Claims, 5 Drawing Sheets

(56) References Cited

U.S. PATENT DOCUMENTS

| | | | |
|---|---|---|---|
| 8,327,876 B2* | 12/2012 | Koyomogi | F16F 7/116 |
| | | | 251/64 |
| 9,464,731 B2* | 10/2016 | Haneda | F16K 51/00 |
| 2005/0257836 A1* | 11/2005 | Boyer | G05D 16/0666 |
| | | | 137/505.34 |
| 2006/0070664 A1* | 4/2006 | Tom | F16K 25/005 |
| | | | 137/505.39 |
| 2012/0241662 A1* | 9/2012 | Clifford | F16K 27/0236 |
| | | | 251/356 |
| 2017/0211481 A1 | 7/2017 | Denton | |
| 2017/0321689 A1 | 11/2017 | Fangauer et al. | |

FOREIGN PATENT DOCUMENTS

| | | |
|---|---|---|
| DE | 1146320 B | 3/1963 |
| DE | 3222247 A1 | 12/1983 |
| DE | 102012102646 A1 | 10/2013 |
| DE | 102015203733 A1 | 9/2016 |
| DE | 102016203557 A1 | 9/2017 |
| DE | 102018102886 A1 | 8/2018 |
| EP | 3026313 A1 | 6/2016 |

OTHER PUBLICATIONS

Search Report for European Patent Application No. 22163567.5 dated Jul. 26, 2022, 10 pages.
Office Action for Canadian Patent Application No. 3,153,659, dated Sep. 27, 2023, 4 pages.

* cited by examiner

PRESSURE CONTROL CHARACTERISTIC—DIFFUSER

CROSS-REFERENCES TO RELATED APPLICATION

This application claims the benefit of German Application No. 10 2021 107 202.6, filed Mar. 23, 2021.

BACKGROUND

The prior art, in particular the applicant's DE 10 2012 102 646 A1 or DE 10 2018 102 886 A1, has disclosed gas control valves and gas control valve arrangements which allow precise control of a volumetric flow rate of a gas flow. With regard to the functioning of such gas control valves or gas control valve arrangements, reference is made to these published patent applications, and the contents thereof as encompassed by the description of the figures and by the figures are incorporated into the disclosure of this patent application by reference.

DETAILED DESCRIPTION

Figure 1:
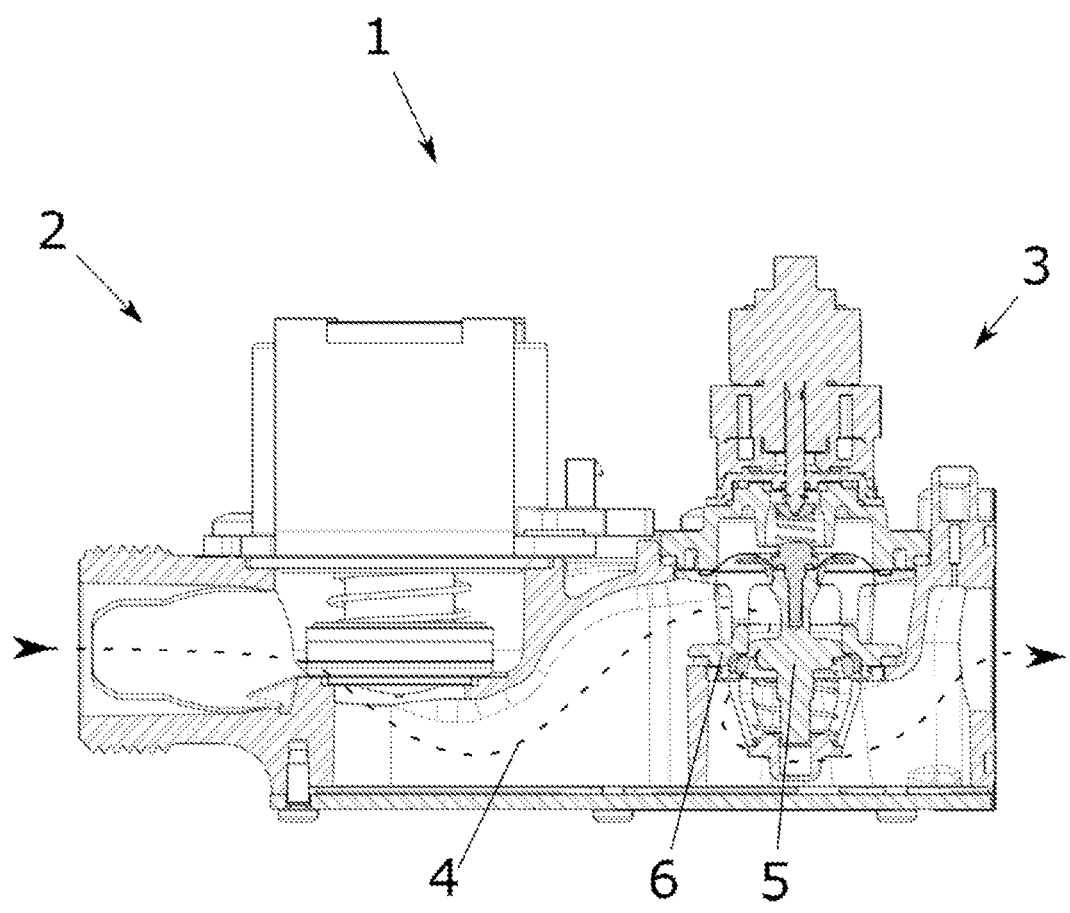
FIG. 1 shows an overview of a gas valve unit in a closed position.

In gas control valves, it is constantly sought to optimize the pressure control characteristics and throughflow capacities and prevent an occurrence of secondary effects, such as noise generation owing to periodic pressure fluctuations. To improve these characteristics, precise tuning of the control system of a gas control valve is necessary, in particular in the case of small opening cross sections and increasing volumetric flow rates.

Proceeding from a gas control valve according to the prior art, at least one improvement of the pressure control characteristics is achieved by way of a gas control valve according to the features of claim 1. The dependent claims specify advantageous refinements and expedient embodiments.

In the context of the present disclosure, a diffuser is a component which, owing to its geometry, for a given flow of a gas, enlarges the flow cross section along the flow direction. Owing to the change in cross section, a negative pressure is generated downstream of the diffuser, which negative pressure acts on movable components.

In the context of the present disclosure, the cross-sectional characteristic is the profile of the cross section of the opening between the valve seat and the valve body, which forms the available cross section for the throughflow of gas.

To achieve the object, a gas flow control valve is proposed, wherein the gas flow control valve comprises a housing with a gas inlet, a valve seat arranged in the housing, a valve body assigned to the valve seat, wherein the valve body is held by an upper spring and a lower spring and is centered by means of a diaphragm, and a gas outlet which is positioned downstream of the valve body and which is provided in the housing. Here, the valve body is arranged in the valve seat so as to be movable in a first movement direction in order to form a controllable cross section of a passage opening for the passage of gas. One example of the invention is characterized in that the gas flow control valve comprises an adjustable diffuser.

The provision of an adjustable diffuser, that is to say of a variable profile of a widening cross section in the passage opening, gives rise to resulting pressure control with a more homogeneous flow through the valve and an associated increase in capacity.

Provision is made here for a valve seat diffuser geometry to be provided on the valve seat in the region of the passage opening and/or for a valve body diffuser geometry to be provided on the valve body in the region of the passage opening.

In the case of certain throughflows, depending on the valve position and the operating pressure, an arrangement of a diffuser geometry in the region of the control valve gives rise to a resultant force that opens or closes the valve depending on the throughflow. This has an advantageous effect on the control behaviour of the gas flow control valve.

Moreover, in the case of the gas flow control valve, provision is made for the adjustable diffuser to exhibit its adjustable cross-sectional characteristic by way of two diverging curves, in particular non-linear curves, for example with a superposed offset in an opening direction.

The cross-sectional characteristic implemented by way of two non-linear curves gives rise to particularly good flow guidance, and at the same time promotes the action of the diffuser on the valve body.

In particular, for this purpose, provision is made for an inlet path, such as an inlet path that is uniform in a flow direction, in particular a hollow cylindrical inlet path, to be formed on the valve seat upstream of the passage opening.

Owing to the inlet path that is uniform in a flow direction, a more homogeneous incident flow on the control valve is generated, as a result of which flow noises are reduced and, owing to a more uniform throughflow, the capacity of the gas valve is increased.

In the gas flow control valve, the passage opening is configured as an annular gap in one example, which likewise promotes the homogeneous throughflow and allows a uniform action of the diffuser.

In one embodiment, provision is made for the valve seat diffuser geometry to be formed integrally with the valve seat.

In this way, the geometry can be tuned, and integrated into the assembly, during the production process in a defined and also inexpensive manner.

Likewise, in a further or additional embodiment, provision is made for the valve body diffuser geometry to be formed integrally with the valve body in order to achieve the above-stated advantages.

The valve seat diffuser geometry is particularly configured as a fillet in one example. Owing to the configuration as a fillet, the specified flow direction of the gas flow through the valve is implemented without any separation edges, which promotes the throughflow and allows a uniform action of the diffuser.

Moreover, provision is also made for the valve body diffuser geometry to be configured as a ring segment, in particular with a convex shell contour, such as with a circular shell contour.

The configuration as a ring segment allows the use of different sections of the valve body diffuser geometry on the one hand as a guide element for the flow of the gas flow and on the other hand as a contour element for the formation of a diverging cross-sectional profile, which provides the effects of a diffuser.

The described profile is in particular advantageously provided by virtue of the valve body diffuser geometry together with the valve seat diffuser geometry forming, in an upper section in a flow direction, a flow channel, and forming, in a lower section following this in the flow direction, especially by a divergence between the radii, a diffuser channel. If the valve body is open such that the "diffuser effect" is reduced, a negative pressure forms in the cavity below the valve body, which negative pressure additionally pulls the valve body downwards. This contributes to an increase in the capacity, and the pressure-independent control is continued for longer.

Here, the flow-promoting upper section receives the gas flow in a flow channel and conducts said gas flow, without any separation edges or discontinuities, to the diverging lower section as diffuser channel. In this way, a uniform and undisturbed inflow into the diffuser is achieved, which promotes the throughflow and allows a uniform action of the diffuser.

In one embodiment, provision is moreover made for at least one bypass geometry, which can include multiple bypass geometries at uniform intervals around a circumference, to be formed on the valve seat at the boundary region with respect to the passage opening.

In the closed state of the valve, a defined throughflow is required for various applications, for example in the case of a leak test or if the space upstream of the control valve is to be purged, such as in the case of a valve proof system test. In order to prevent an "orifice effect", which results in greater throughflows in the presence of rising pressure, the smallest cross section, for example through a contact surface between valve body and valve seat, is not closed. By being formed at the boundary region of the passage opening, the bypass is defined under the part-load range without having a further influence on the control behaviour.

In a further embodiment of the gas flow control valve, provision is made for the bypass geometry to allow a defined throughflow of the gas flow when the gas flow control valve is closed. In this way, an orifice effect of the gas flow control valve can advantageously be avoided.

In a further embodiment of the gas flow control valve, provision is made for the defined throughflow to be limited by way of a tolerance situation of valve body and valve seat and a proportional cross section at the circumference of a contact edge of the valve body. It is advantageous here that, owing to mobility of at least one of the two elements that form the bypass, these are flushed, or blown clear, during the operation of the gas flow control valve. Contamination with particles can hereby be prevented.

In a further embodiment of the gas flow control valve, provision is made for a guide cage positioned downstream of the valve seat to be formed in the housing, such as on the valve seat or on a spring receptacle, and a guide shaft to be formed on the valve body, wherein the guide shaft is guided linearly in an opening direction of the valve in at least one section of the guide cage, and in particular comprises a damper for the movement of the valve body.

The gas flow control valve is a spring-mass-spring system, and has a tendency to vibrate under certain operating conditions. In the event of vibrations transversely and axially with respect to the opening and closing direction, the guide shaft makes contact with the guide and thus prevents the excitation of the vibration in the transverse direction and in the axial direction. The guide furthermore prevents the undesired deflection of the control valve, and has no influence on the control behaviour. The system may optionally be supplemented by an air damper, whereby vibrations in the axial direction can be reduced.

In a further embodiment of the gas flow control valve, provision is made for an inversion of the diaphragm to be prevented by means of a support element. In an opened state of the gas flow control valve, the diaphragm does not lie on the support element and therefore has no influence on the operation, whereas in the closed state, in the presence of negative pressure generated for example by a fan during flushing of the gas valve, the diaphragm lies on the support element. Thus, upon the opening of the gas flow control valve and/or upon application of negative pressure, vibrations that can adversely affect a starting behaviour of the gas flow control valve can advantageously be prevented.

FIG. 1 shows an overview of a gas valve unit 1 in a closed position, comprising a safety valve 2 and a gas flow control valve 3 for controlling a volumetric flow rate of a gas flow with a gas flow profile 4.

Figure 2:
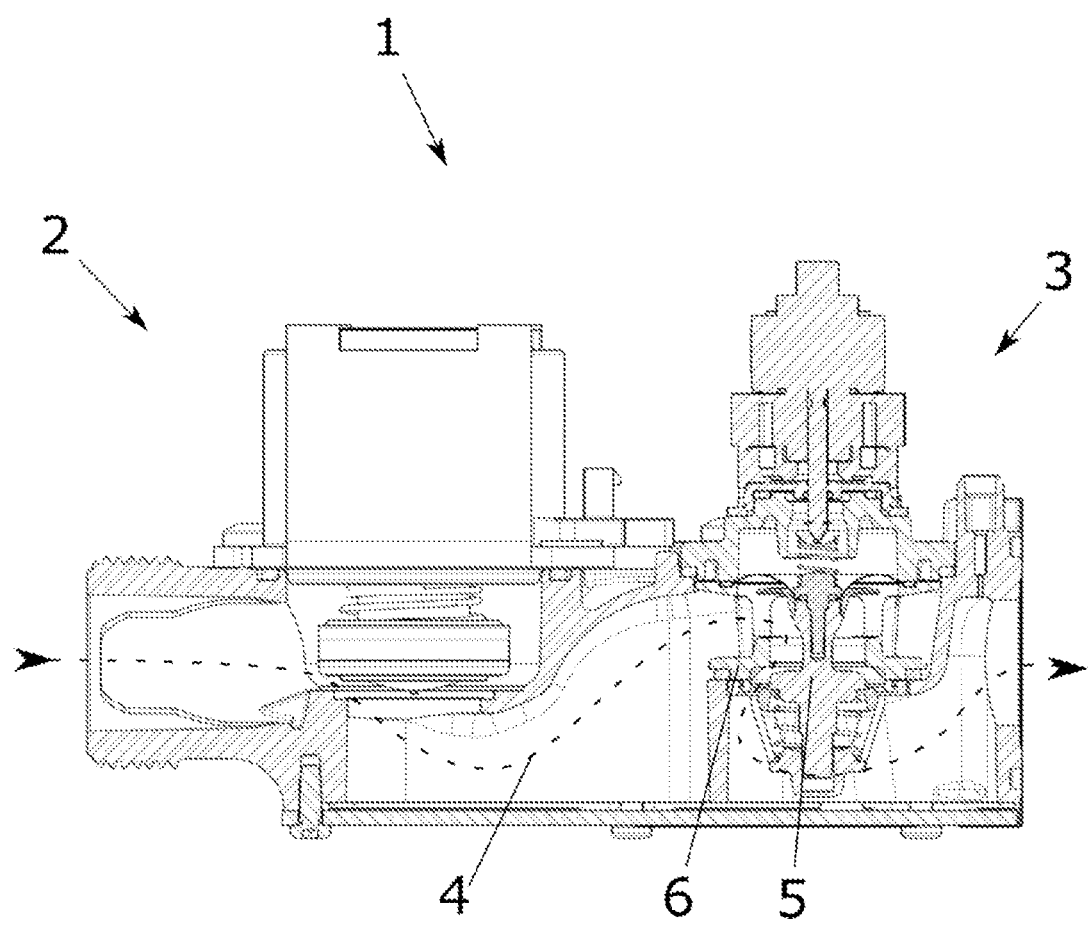
FIG. 2 shows an overview of a gas valve unit in an opened position.

FIG. 2 shows, analogously to FIG. 1, an overview of the gas valve unit 1 in an opened position, comprising the safety valve 2 and the gas flow control valve 3 for controlling a volumetric flow rate of the gas flow with the gas flow profile 4. Viewing FIGS. 1 and 2 together, it is illustrated that, for the control of the gas flow profile 4, the gas flow control valve 3 can be opened by means of a valve body 5 that moves relative to a valve seat 6.

Figure 3:
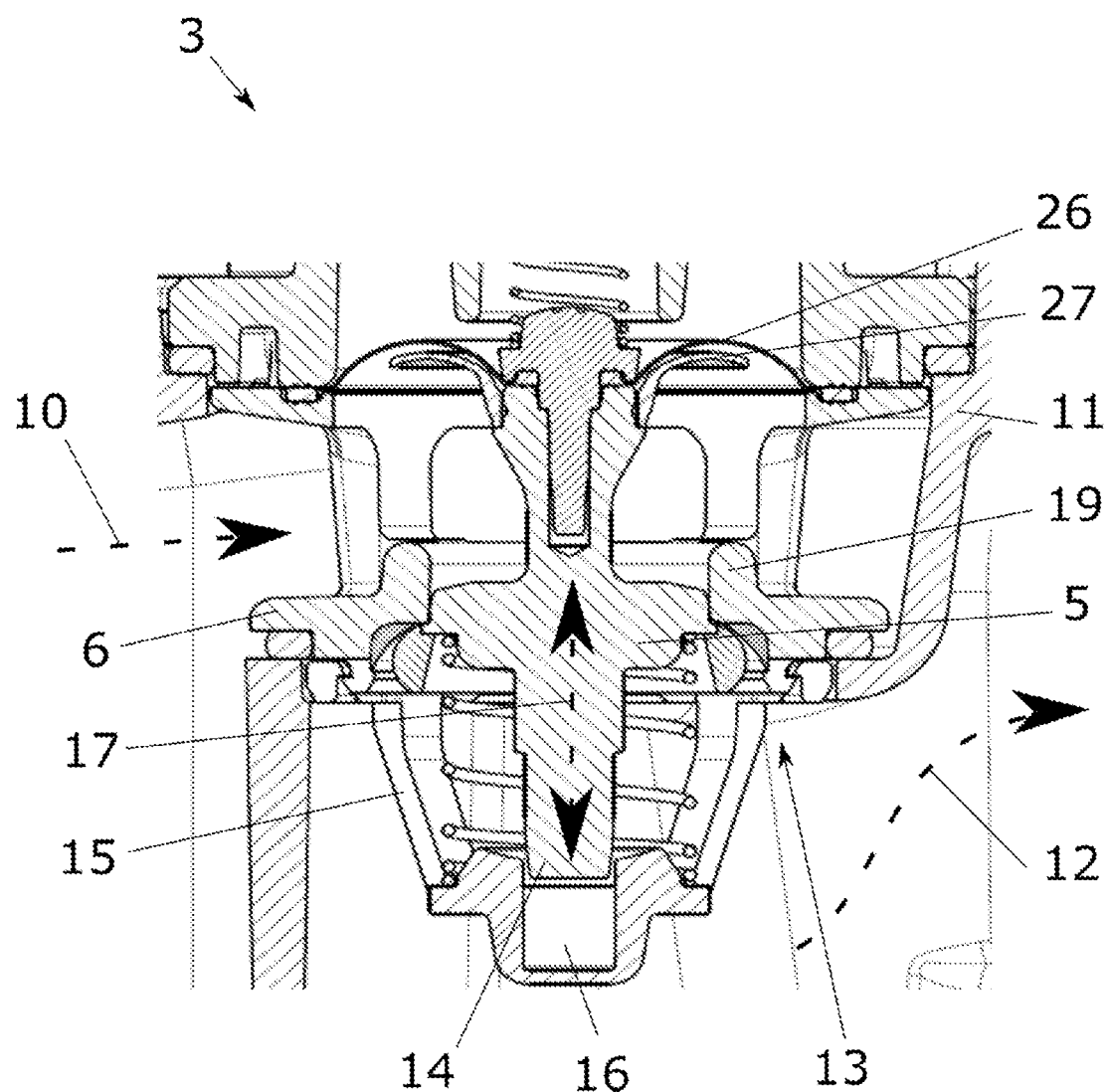
FIG. 3 shows a detail view of a gas flow control valve in a closed position.

FIG. 3 shows a detail view of the gas flow control valve 3 in a closed position. The gas flow control valve 3 comprises a housing 11 with gas inlet 10, and a valve body 5 assigned to the valve seat 6, wherein the valve body 5 is held by a diaphragm 26. An inversion of the diaphragm owing to a prevailing negative pressure before the opening of the safety valve is prevented by means of a support element 27. A sudden pressure increase that occurs as a result of the opening of the safety valve therefore does not have an adverse effect on the starting behaviour, and the vibration behaviour is reduced. A homogeneous flow profile can thus be achieved more quickly. The capacity can thus be optimized, and a generation of noise can be prevented.

It is furthermore illustrated that a guide cage 15 positioned downstream of the valve seat 6 is formed in the housing 11 and on the valve seat 6, and a guide shaft 14 is formed on the valve body 5, wherein the guide shaft 14 is guided linearly in an opening direction of the valve in at least one section of the guide cage 15, and comprises a damper 16 for the movement of the valve body 5. An undesired deflection of the gas flow control valve 3 in an axial direction and in a transverse direction can thus be prevented without the control behaviour being influenced. The damper 16 can additionally reduce vibrations in an axial direction.

Figure 4:
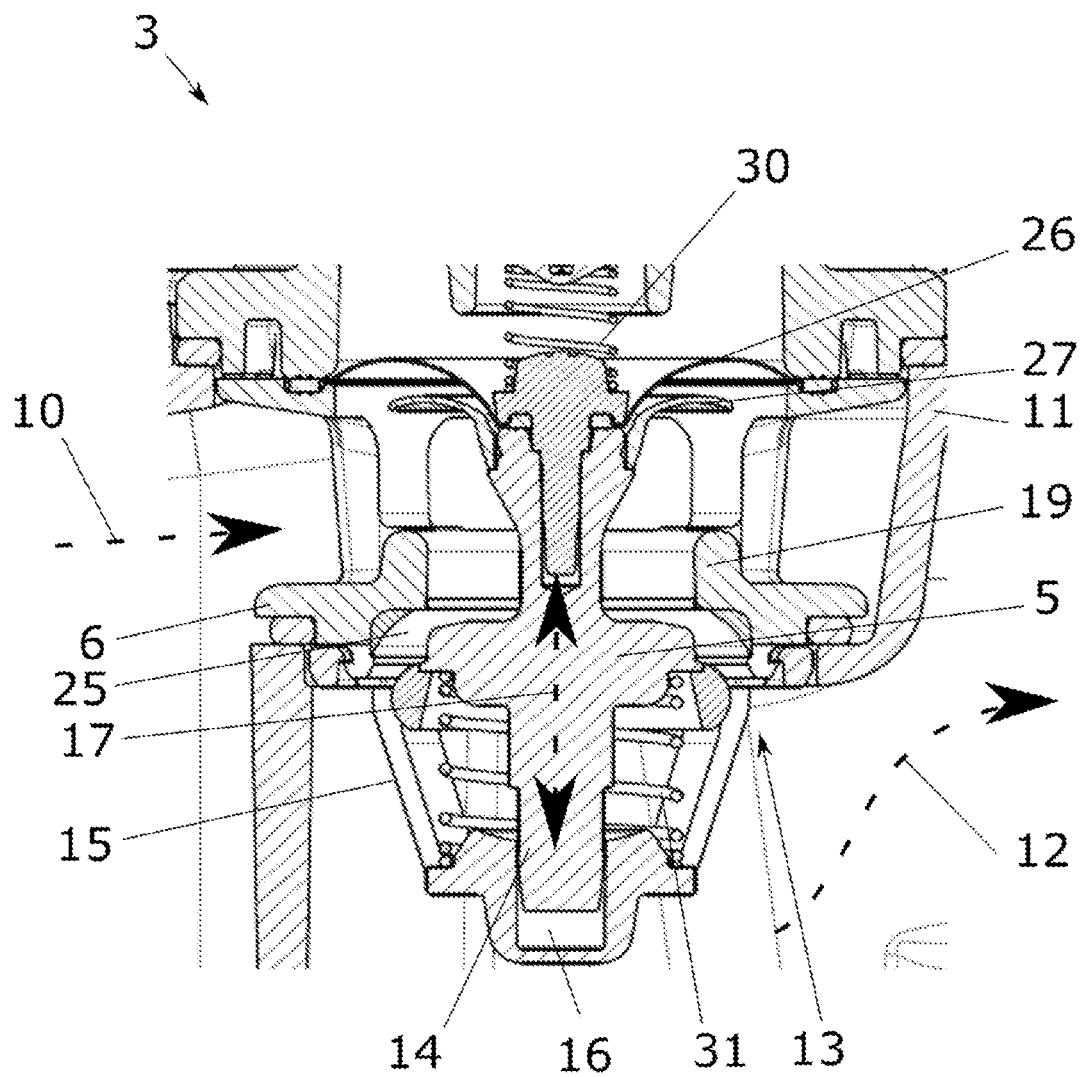
FIG. 4 shows a detail view of a gas flow control valve in an opened position.

FIG. 4 shows a detail view of a gas flow control valve 3 analogous to FIG. 3 in an opened position. The gas flow control valve 3 comprises a gas outlet 12 which is positioned downstream of the valve body 5 and which is provided in the housing 11. The valve body 5 is arranged in the valve seat 6 so as to be movable in a first movement direction 17 in order to form a controllable cross section of a passage opening 25 for the passage of gas. The valve body 5 is held primarily by an upper spring 30 and a lower spring 31. The force of the upper spring 30 and of the lower spring 31 is configured such that the valve body, in a rest position, is pressed against a contact edge (illustrated in FIG. 5). The diaphragm 26 serves primarily both as a seal and as a transmitter of a pneumatic force, which pushes the valve body 5 upwards with varying intensity in a manner dependent on the prevailing pressure. Owing to the rotationally symmetrical shape of the diaphragm 26, the valve body 5 is additionally centered thereby.

The gas flow control valve 3 furthermore comprises an adjustable diffuser 13. A hereby variable profile of the widening cross section of a passage opening 25 can allow resulting pressure control for an optimized flow through the gas flow control valve 3, which can be utilized for a more homogeneous throughflow and an increase in the capacity of the gas flow control valve 3.

Figure 5:
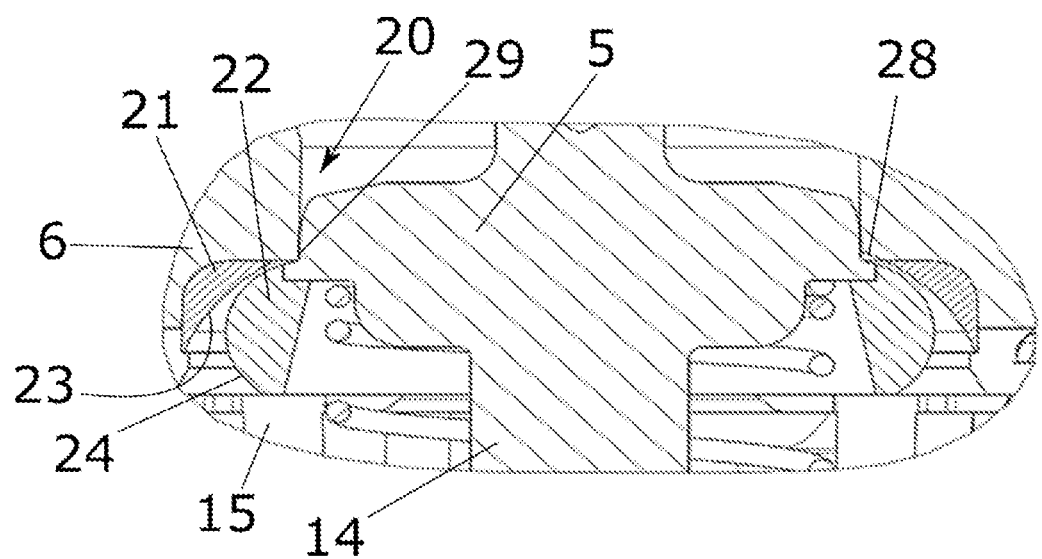
FIG. 5 shows an enlarged view of a detail of the gas flow control valve with a diffuser in a closed position.

Viewing FIGS. 3 and 5 together, it is illustrated that the adjustable diffuser 13 has an adjustable cross-sectional characteristic by way of two diverging, non-linear curves, which are superposed with an offset in an opening direction. The action of the diffuser 13 can thus be optimized in order to improve the flow guidance. In a manner dependent on valve position and operating pressure, in the presence of given throughflows, a force is generated that opens or closes the gas flow control valve 3. This can thus have an advantageous effect on the control behaviour of the gas flow control valve 3.

It is furthermore illustrated that, on the valve seat 6, upstream of the passage opening 25, there is formed an inlet path 19 which is uniform and hollow cylindrical in a flow direction. The passage opening 25 is in this case configured as an annular gap. A more homogeneous incident flow on the gas flow control valve 3 can thus be made possible, which can reduce a generation of noise and achieve an optimization of capacity.

FIG. 5 shows an enlarged view of a detail of the gas flow control valve 3 with a diffuser 13 in a closed position.

Viewed together with FIG. 4, it is illustrated that the gas flow control valve 3 comprises a valve seat diffuser geometry 21 on the valve seat 6 in the region of the passage opening 25 (illustrated in FIG. 4) and comprises a valve body diffuser geometry 22 on the valve body 5 in the region of the passage opening 25 (illustrated in FIG. 4). This can have an advantageous effect on the flow guidance and thus on the optimization of the capacity.

A bypass geometry 28, which can include multiple bypass geometries at uniform intervals around a circumference (illustrated in FIG. 5), is/are formed on a valve seat 6 at the boundary region with respect to the passage opening 25. A defined throughflow is possible in the closed state, which throughflow is limited by way of a tolerance situation of valve body 5 and valve seat 6 and a proportional cross section at the circumference of a contact edge 29 of the valve body 5. This can advantageously prevent the occurrence of an orifice effect, and the capacity and/or the generation of noise are not influenced by the bypass geometry 28.

It is furthermore illustrated that, on the one hand, the valve seat diffuser geometry 21 is configured as a fillet 23 and is formed integrally (not illustrated) with the valve seat 6, and on the other hand, the valve body diffuser geometry 22 is formed integrally (not illustrated) with the valve body 5. This can be positively utilized to reduce the costs of the production process. The valve body diffuser geometry 21 is furthermore illustrated as being configured as a ring segment with a convex and circular shell contour, which allows the use of different sections of the valve body diffuser geometry 22 both as a guide element for the flow of the gas flow and as a contour element for the formation of a diverging cross-sectional profile, which imparts the effects of the diffuser 13. The valve body diffuser geometry 22 together with the valve seat diffuser geometry 21 forms firstly, in an upper section in a flow direction, a flow channel, and forms secondly, in a lower section following this in the flow direction, especially by a divergence between the radii, a diffuser channel. A uniform and undisturbed inflow into the diffuser 13 can thus be achieved, which promotes the throughflow and allows a more homogeneous action of the diffuser 13.

Although the present invention has been described with reference to preferred embodiments, workers skilled in the art will recognize that changes may be made in form and detail without departing from the spirit and scope of the invention.

LIST OF REFERENCE DESIGNATIONS

1 Gas valve unit
2 Safety valve
3 Gas flow control valve
4 Gas flow profile
5 Valve body
6 Valve seat
10 Gas inlet
11 Housing
12 Gas outlet
13 Diffuser
14 Guide shaft
15 Guide cage
16 Damper
17 Movement direction
19 Inlet path
20 Annular gap
21 Valve seat diffuser geometry
22 Valve body diffuser geometry
23 Fillet
24 Ring segment
25 Passage opening
26 Diaphragm
27 Support element
28 Bypass geometry
29 Contact edge
30 Upper spring
31 Lower spring

The invention claimed is:
1. A gas flow control valve comprising:
a housing with a gas inlet,
a valve seat arranged in the housing,
a valve body assigned to the valve seat,
wherein the valve body is held by an upper spring and a lower spring and is centered by a diaphragm, and
a gas outlet which is positioned downstream of the valve body and which is provided in the housing,
wherein
the valve body is arranged in the valve seat so as to be movable in a first movement direction in order to form a controllable cross section of a passage opening for the passage of gas,
the gas flow control valve comprises an adjustable diffuser, and
the adjustable diffuser exhibits an adjustable cross-sectional characteristic by way of two diverging curves,
wherein at least one bypass geometry is formed on the valve seat at a boundary region with respect to the passage opening, and
wherein the at least one bypass geometry allows a defined throughflow of gas flow when the gas flow control valve is closed.

2. The gas flow control valve of claim 1, wherein the defined throughflow is limited by way of a tolerance situation of valve body and valve seat and a proportional cross section at a circumference of a contact edge of the valve body.

3. A gas flow control valve comprising:
a housing with a gas inlet,
a valve seat arranged in the housing,
a valve body assigned to the valve seat,
wherein the valve body is held by an upper spring and a lower spring and is centered by a diaphragm, and
a gas outlet which is positioned downstream of the valve body and which is provided in the housing,
wherein
the valve body is arranged in the valve seat so as to be movable in a first movement direction in order to form a controllable cross section of a passage opening for the passage of gas,
the gas flow control valve comprises an adjustable diffuser, and
the adjustable diffuser exhibits an adjustable cross-sectional characteristic by way of two diverging curves,
wherein the two diverging curves comprise non-linear curves, and,
wherein the non-linear curves have a superposed offset in an opening direction.

4. A gas flow control valve comprising:
a housing with a gas inlet,
a valve seat arranged in the housing,
a valve body assigned to the valve seat,
wherein the valve body is held by an upper spring and a lower spring and is centered by a diaphragm, and
a gas outlet which is positioned downstream of the valve body and which is provided in the housing,
wherein
the valve body is arranged in the valve seat so as to be movable in a first movement direction in order to form a controllable cross section of a passage opening for the passage of gas,
the gas flow control valve comprises an adjustable diffuser,
at least one bypass geometry is formed on the valve seat at a boundary region with respect to the passage opening, and
the at least one bypass geometry comprises multiple bypass geometries at uniform intervals around a circumference.

5. The gas flow control valve of claim 4, wherein the adjustable diffuser exhibits an adjustable cross-sectional characteristic by way of two diverging curves.

6. The gas flow control valve of claim 4, and further comprising at least one of:
a valve seat diffuser geometry provided on the valve seat in a region of the passage opening, or
a valve body diffuser geometry is provided on the valve body in a region of the passage opening.

7. The gas flow control valve of claim 4, and further comprising an inlet path formed on the valve seat upstream of the passage opening.

8. The gas flow control valve of claim 7, wherein the inlet path is uniform in a flow direction.

9. The gas flow control valve of claim 8, wherein the inlet path comprises a hollow cylindrical inlet path.

10. The gas flow control valve of claim 4, wherein the passage opening is configured as an annular gap.

11. The gas flow control valve of claim 4, and further comprising a valve seat diffuser geometry formed integrally with the valve seat.

12. The gas flow control valve of claim 4, and further comprising a valve body diffuser geometry formed integrally with the valve body.

13. The gas flow control valve of claim 4, and further comprising a valve seat diffuser geometry configured as a fillet.

14. The gas flow control valve of claim 4, and further comprising a valve body diffuser geometry configured as a ring segment.

15. The gas flow control valve of claim 4, and further comprising a valve body diffuser geometry together with a valve seat diffuser geometry that forms a flow channel in an upper section in a flow direction and forms a diffuser channel in a lower section following the flow channel in the flow direction by a divergence.

16. The gas flow control valve of claim 4, wherein at least one bypass geometry is formed on the valve seat at a boundary region with respect to the passage opening.

17. The gas flow control valve of claim 4, and further comprising:
a guide cage positioned downstream of the valve seat formed in the housing, and
a guide shaft formed on the valve body, wherein the guide shaft is guided linearly in an opening direction in at least one section of the guide cage.

18. The gas flow control valve of claim 4, and further comprising a support element configured to prevent an inversion of the diaphragm.

19. The gas flow control valve of claim 4, wherein the two diverging curves comprise non-linear curves.

* * * * *